Feb. 13, 1934.  T. S. BINDSCHEDLER  1,946,468
ELECTRIC MOTOR
Filed Aug. 14, 1931   3 Sheets-Sheet 2

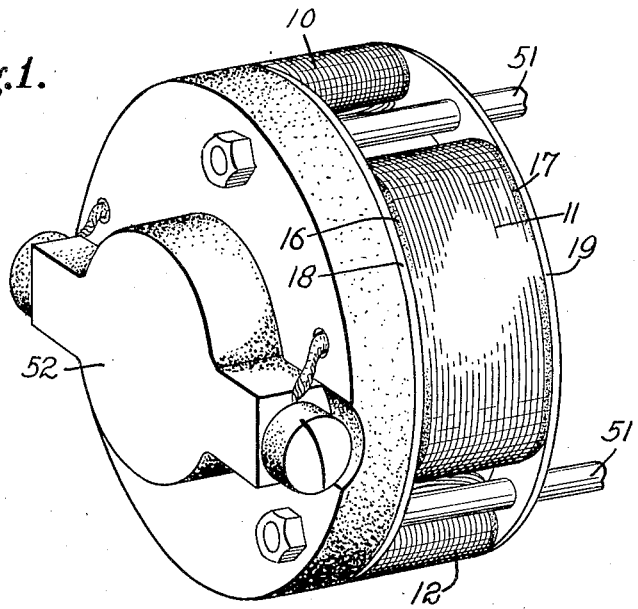
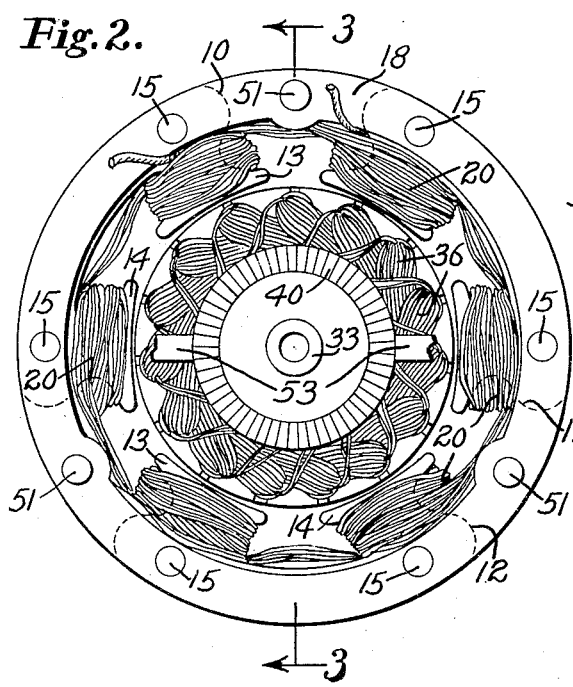
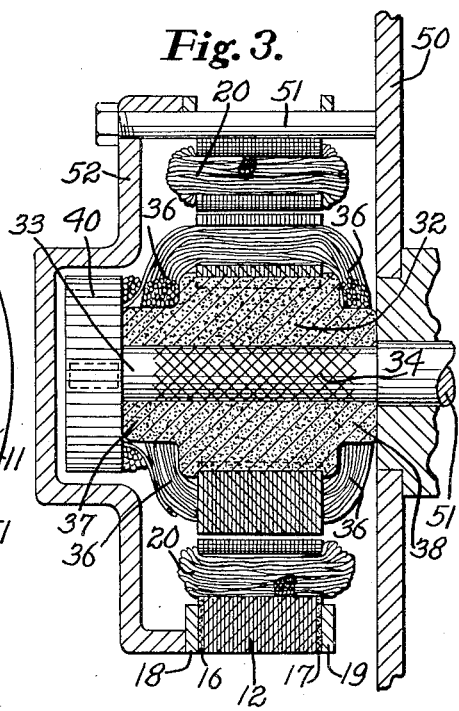

INVENTOR
Theodore S. Bindschedler
BY
ATTORNEYS

Feb. 13, 1934.  T. S. BINDSCHEDLER  1,946,468
ELECTRIC MOTOR
Filed Aug. 14, 1931    3 Sheets-Sheet 3

INVENTOR
Theodore S. Bindschedler
BY
Rider, Hibben, Davis, & Macauley
ATTORNEYS

Patented Feb. 13, 1934

1,946,468

UNITED STATES PATENT OFFICE 1,946,468

ELECTRIC MOTOR

Theodore S. Bindschedler, Detroit, Mich., assignor to Burroughs Adding Machine Company, Detroit, Mich., a corporation of Michigan Application August 14, 1931. Serial No. 557,051

10 Claims. (Cl. 172—276)

This invention relates to an electric motor. It is directed particularly to a small universal motor, that is, one that will operate on both direct and alternating current.

The motor has been devised especially for driving calculating and bookkeeping machines and it has been illustrated in the drawings as used for such purpose. Calculating machines are designed to operate at definite normal speeds and, unless operated at these speeds, the machines will often not perform satisfactorily. If the starting torque of a motor driving such a machine is small, the machine will be operated slowly. On the other hand, if the starting torque is high, the machine will be operated with a bang that will be detrimental to successful operation and harmful to the machine. In some cases, calculating machines are used only a few times a day and the entries made on them are of small figures requiring the operation of only a part of the mechanism, whereas, in other offices, the machines are in constant operation almost day and night and the entries may be of large numbers requiring operation of all the mechanism. The electric current supply in different cities, states and countries varies greatly in character, that is, it may be direct or alternating, its voltage may vary and the frequency, when alternating current is used, often varies. A motor that drives calculating machines should be capable of giving equal starting torque under all these varying conditions.

The type of motor most suitable for these conditions is a series-wound commutator motor and the invention relates to this type of motor. The difficulty with series-wound commutator motors has been that the torque is usually much greater with direct current than with alternating current. This is due largely to the fact that, when the motor is operating with direct current, the current flow through the armature is opposed only by the resistance of the winding and the counter-electromotive force of the armature whereas, when the motor is operating with alternating current, the current flow is opposed not only by the resistance of the winding and the counter-electromotive force of the armature but also by the self-induction or reactance of the field and armature. The latter factor greatly reduces the amount of alternating current that will flow through the armature for a given voltage and, since the torque is a function of the amount of current flowing, the torque of the motor when used with alternating current is much less than when used with direct current.

The present invention comprehends the production of a small series-wound commutator motor that will have substantially the same starting torque on alternating current as on direct current.

The general object of the invention is to provide an improved universal motor.

A further object is to provide an improved motor construction in which the reactance of the windings to alternating current is greatly reduced.

Another object is to provide an extremely simple and inexpensive motor construction.

Still another object is to provide a motor that will be very small so that it can be placed in a small space on a calculating machine, and one that is very light so that it will not add greatly to the weight of a calculating machine.

Other objects and advantages of the invention will appear from the following specification and drawings.

An embodiment of the invention is shown in the accompanying drawings in which:

Figure 1 is a perspective view of the motor.

Fig. 2 is an end elevation with one of the end cover plates removed to show the interior construction, the view being taken from the commutator end of the motor.

Fig. 3 is a section on the line 3—3 of Fig. 2 but with the end cover of the motor in position.

The motor is a series-wound commutator motor with the armature winding connected in series with the field. As previously mentioned, the flow of direct current through such a motor is opposed mainly by the resistance of the field and armature windings and the counter-electromotive force of the armature. On the other hand, the flow of alternating current is not only opposed by the resistance of the armature and field and by the counter-electromotive force of the armature but also by the self-induction or reactance of the armature and field. In order for the starting torque of the motor to be approximately the same with alternating current as with direct current, it is necessary to have the amount of alternating current flowing through the armature substantially the same as the direct current. One of the problems is, therefore, to reduce the reactance of the armature and the self-induction of the field so that more alternating current will flow than is normally the case so as to increase the alternating current torque and/or decrease the torque developed when direct current is used so as to make it approach the alternating current torque. One of the features of the present invention that assists in achieving this result is the novel field construction.

Figure 5:
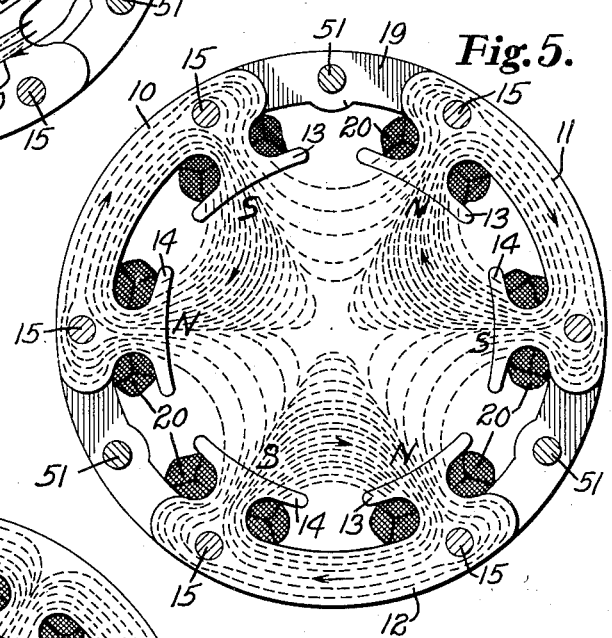
Fig. 5 is a skeletonized view illustrating diagrammatically the position of the lines of flux with the improved field construction.

Referring to Figs. 1 and 5, it will be observed that the laminations in the field are in groups or sets. There are three of these groups in the motor illustrated, the motor being a 6-pole motor. These groups will be designated 10, 11 and 12, respectively.

Each group comprises a plurality of arcuate laminations provided with projecting portions 13 and 14 (Fig. 5) forming pole pieces around which the field windings may be wound. Each group of laminations is held tightly together by means of bolts or rivets 15 and 16 which pass through the laminations; through end plates 16 and 17 (Fig. 1); and through annular connecting plates 18 and 19 made of non-magnetic metal. Each group of laminations is thus held rigidly together and the groups are mechanically united and held in proper relation to each other but each group is magnetically separated from the other, that is, there is no metal to conduct the lines of flux from one group of laminations to the other.

This tends to concentrate the flux in three groups in a six pole motor as illustrated in Fig. 5 which is a reproduction of the actual distribution of the flux without the armature in position as indicated by a demonstration test with iron filings. The distribution without the armature in position has been illustrated for the sake of clearness, the distribution with the armature in position being illustrated in Figs. 6 and 7. It will be observed that most of the lines of flux for any one group of laminations, for example, group 10 in Fig. 5, pass between the north and south poles of this group with very little leakage to the other groups. This is due largely to the fact that there is no iron return path from groups 11 and 12 to group 10. The easiest path for the lines of flux is from the north to the south pole of group 10 and not through the other groups of laminations. The result is that the flux generated by the field coils of group 10 is concentrated between the north and south poles of this group. This same flux distribution occurs when the armature is in place as shown in Fig. 7.

Figure 6:
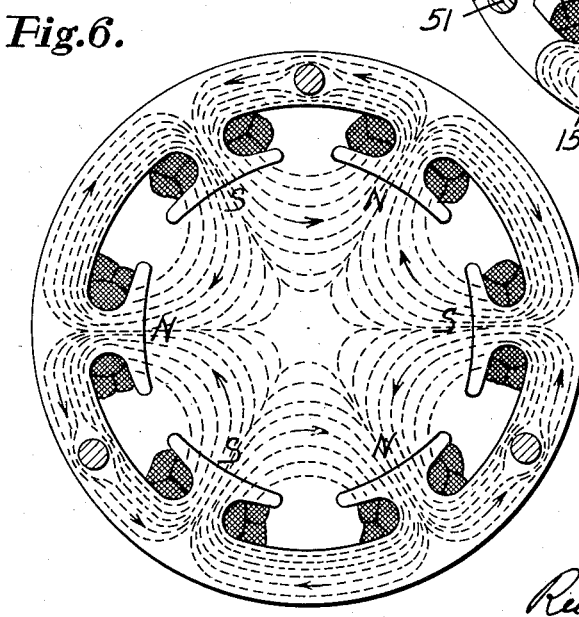
Fig. 6 is a skeletonized view similar to Fig. 5 showing the paths of the lines of flux in an old type of construction, this view being for the purpose of comparison.
Figure 7:
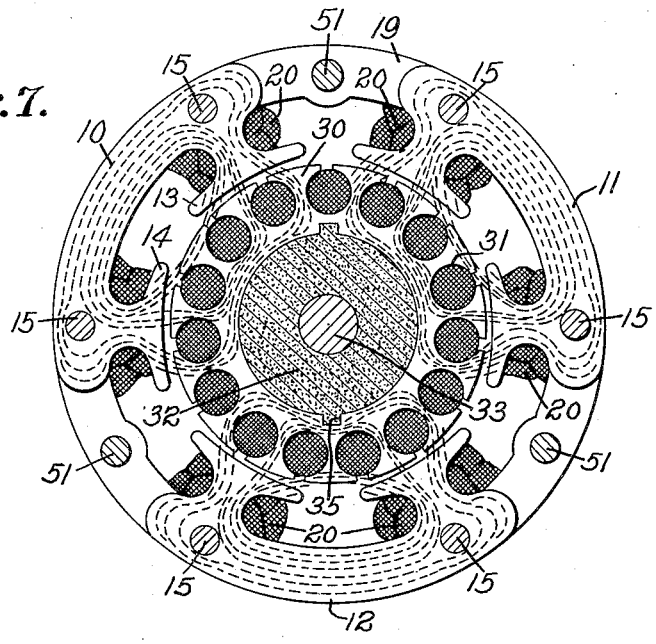
Fig. 7 is another skeletonized view with the armature in place showing the distribution of the lines of flux through the armature.

This distribution of flux is considerably different than that obtained with the old type of field construction illustrated in Fig. 6, which reproduces the result of a demonstration test with iron filings of the type of field frame illustrated in Fig. 6 without the armature in position. It will be observed that, with the old type, the flux is scattered throughout the armature space and is not confined between any two poles or concentrated at any particular place.

An advantage of the new construction is that the self-induction of the field coils is reduced. A coil should be completely surrounded by iron in order to have a maximum self-inductance. When a portion of the path for the flux generated by the coil is through the air, the coil has less self-induction than when the coil is completely surrounded by iron. In the present construction, the field coils have an iron path on only one side and hence do not have as much self-induction as when there is iron on two sides as in Fig. 6.

Another advantage is that the laminations may be made out of narrow strips of metal with much less waste than the old construction. For example, the old type laminations of Fig. 6 must be made of a sheet of metal of the size of the entire lamination of Fig. 6, whereas the small laminations of the respective groups of Fig. 5 may be made of narrow strips of metal stock and, in many cases, may be made of scraps left from other operations.

Still another advantage is that the construction is lighter because there is less heavy metal in the field frame. The space between the groups of laminations, instead of being filled with heavy iron, is empty. The end plates 18 and 19 can be made of a light non-magnetic metal such as aluminum and there are only two of these relatively thin plates. This lightening of the construction is an important factor where motors are used on devices that must be frequently moved, such as portable calculating machines.

Figure 4:
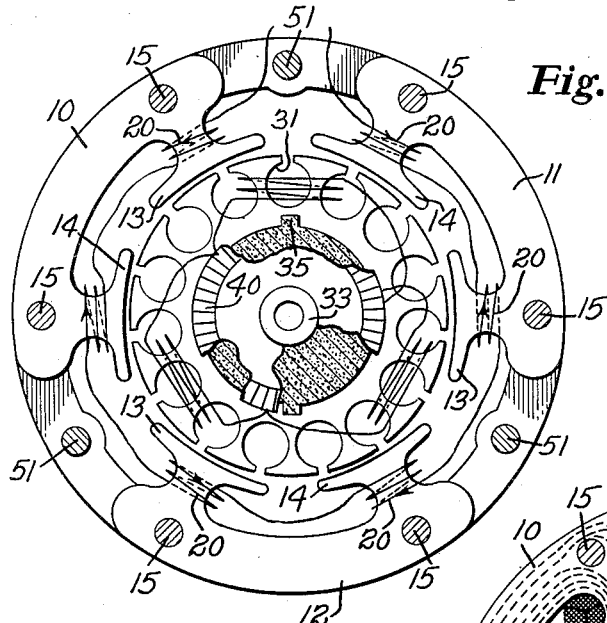
Fig. 4 is a view similar to Fig. 2 but with the windings shown diagrammatically and with some of the parts broken away to show others more clearly.

The field windings 20 are wound around the poles as illustrated diagrammatically in Fig. 4, the windings being connected in series. These windings are preferably of the loose skein type illustrated in Fig. 3, as such construction reduces the reactance and helps improve the characteristics of the motor.

The characteristics of the motor are further improved by the armature construction which is employed in combination with the field.

Referring to Fig. 7 it will be noted that the armature laminations 30 are annular in shape and only slightly wider than the armature slots 31. These laminations are embedded in a body of bakelite 32 which is molded onto the armature shaft 33, the shaft having a roughened portion 34 illustrated in Fig. 3, which enables the moulded bakelite to firmly grip the shaft without turning.

The armature laminations are prevented from turning in the bakelite by means of slots or keyways 35 into which the bakelite is moulded at the time the armature is made. The armature is constructed by assembling the annular laminations in a suitable fixture, placing the armature shaft in position, placing powdered bakelite, or the like, in the center opening, and subjecting the whole to heat and pressure which causes the bakelite to become a solid mass. The laminations are held firmly together by the bakelite body which also holds them on the armature shaft and insulates them from it. The bakelite also forms the support for the ends of the armature windings 36 as illustrated in Fig. 3 where the annular hubs 37 and 38 on the bakelite body are shown supporting the ends of the armature winding.

The armature windings, which are preferably of the drum wound type, are connected to a commutator 40 supported by the armature shaft 33, the armature windings being connected in series of the field in the well-known manner.

Figure 8:
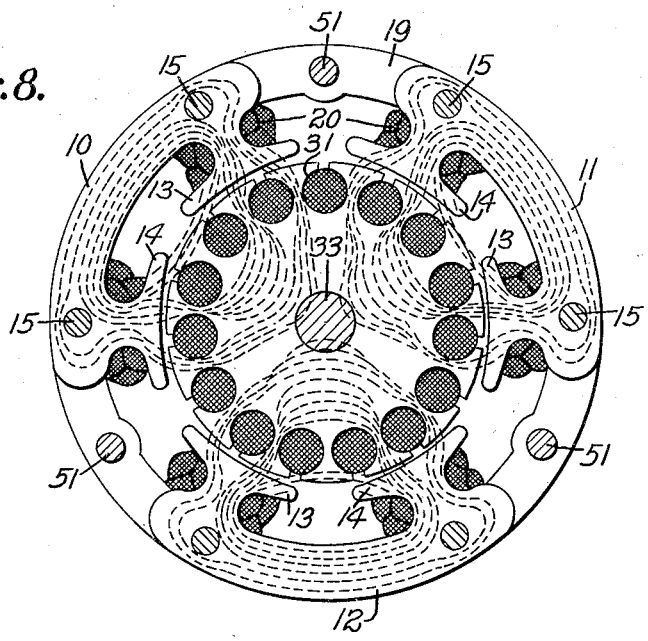
Fig. 8 is a view similar to Fig. 7 with the old style armature construction, this view being for comparison.

This armature construction reduces the reactance of the armature to alternating current by reducing the amount of iron in the armature circuit. The reactance is the function of the iron in the circuit so that by reducing the amount of iron in the armature circuit, the reactance of the armature is reduced. This is done without reducing the useful torque-creating flux because the lines of force are concentrated in the annular lamination in which the armature conductors are located and the inner edges of the annular laminations are more highly saturated than is the iron in the ordinary construction. In the old style construction, such as shown in Fig. 8, wherein the laminations are disk-shaped instead of annular, and where they are keyed to a steel shaft, the inner portion of the amature and the shaft form an iron path for the flux which is not highly saturated and which increases the amount of iron in the circuit without increasing the torque. Part of the energy is spent in heating the armature shaft due to the non-laminated character of the shaft.

Another important point is that the torque of the armature is reduced with direct current. With an old style armature having disk laminations connected directly to a steel armature shaft, the inner portions of the disks and the armature shaft form an iron path for the flux which enables a direct current to create a maximum flux. With the new construction, the annular laminations become saturated more quickly and there is no additional iron path for the flux. The body of insulating material forms no such path and the armature shaft is separated from the laminations by this insulating material so that the flux cannot reach the shaft easily. The tendency is to decrease the flux generated by direct current and thus decrease the torque.

The advantages mentioned contribute to making the torque characteristics of the motor on alternating and direct current more nearly equal. By reducing the reactance to alternating current, more current flows and the torque is increased. By reducing the flux generated by direct current the direct current torque is decreased with the result that the torques on direct and alternating current approach each other.

Another advantage of the construction is that the armature is lighter and therefore has less inertia. This enables quick starting and stopping. Taking into consideration that this result is achieved without reducing the torque, it will be appreciated that much better starting and stopping characteristics are obtained.

Another novel feature of the present motor is the manner in which it is combined with a calculating machine to drive it. Referring to Fig. 3, one of the side plates 50 of a calculating machine is shown through which projects the main drive shaft 51 of the machine. Instead of having a separate motor connected through a clutch and reduction gear to the drive shaft of the calculating machine, the armature of the motor is mounted directly on the drive shaft and is supported by it. The drive shaft also supports the commutator 40, there being no bearing at the left hand end of the armature as illustrated in Fig. 3. This construction is made possible by the light nature of the armature and by the fact that the armature can be rigidly fixed to a relatively large drive shaft that has ample bearing support at one end. The field frame is supported independently of the armature by the side frame 50 of the calculating machine. Bolts 51 pass through openings in the circular end plates 18 and 19 of the field frame and into the calculating machine frame plate 50. These bolts are also used to hold an end cap 52 of insulating material, preferably bakelite, which closes the outer end of the motor and supports the brushes 53 for the commutator.

While the construction illustrated is the preferred construction, it is to be understood that it has been shown for purposes of illustration only and that variations may be made in it without departing from the spirit and scope of the invention as defined by the appended claims. The explanation of the causes for the improved characteristics is believed to be correct and is the best that can be given at the present time.

I claim:

1. An electric motor for use on both alternating and direct currents having a field frame comprising individual groups of laminations of magnetically permeable material, said groups forming field poles, windings on said poles, non-magnetic means supporting said groups of laminations in spaced relation to provide a split and balanced magnetic field, an armature within said field frame having a commutator, and a winding on said armature in series with the windings on said poles.

2. An electric motor for use on both alternating and direct currents having a field frame comprising individual groups of laminations of magnetically permeable material, each group forming two field poles, windings on said poles, non-magnetic means supporting said groups of laminations in spaced relation to form a split and balanced magnetic field, an armature having a commutator, and a winding on said armature in series with the windings on said poles.

3. An electric motor for use on both alternating and direct currents having a field frame comprising individual groups of arcuate laminations of magnetically permeable material, each group forming two pole pieces, windings on said pole pieces, annular rings of non-magnetic material supporting said groups of laminations in spaced relation to provide a split and balanced field, an armature within said field frame having a commutator, and a winding on said armature connected to said commutator and in series with said field pole windings.

4. An electric motor for use on both alternating and direct currents having a field frame comprising individual groups of laminations of magnetically permeable material forming pole pieces, windings on said pole pieces, non-magnetic means supporting said groups of laminations in spaced relation to form a split and balanced field, an armature having an armature shaft and a commutator, said armature also having annular laminations of magnetically permeable material spaced at a substantial distance from said armature shaft, a body of phenolic condensation material between said armature shaft and said annular laminations for rigidly supporting said laminations mechanically on said shaft, for insulating them from said shaft, and for separating them magnetically from said shaft, and a winding on said armature connected in series with said field windings.

5. In a motor adapted to operate on both alternating and direct currents, an armature comprising a plurality of annular laminations of magnetically permeable material, a shaft, and a body of insulating material surrounding said shaft and rigidly supporting said laminations on said shaft concentric therewith and spaced at a substantial radial distance therefrom.

6. In an electric motor for use on both alternating and direct currents, an armature having an armature shaft and a commutator, said armature having annular laminations of magnetically permeable material spaced at a substantial distance from said armature shaft, a body of phenolic condensation material between said shaft and said laminations for rigidly supporting said laminations on said shaft, for insulating them from said shaft, and for separating them magnetically from said shaft.

7. In a motor adapted to operate on either direct or alternating current, an armature comprising a shaft, a plurality of annular laminations of magnetically permeable material surrounding said shaft and spaced a substantial distance therefrom, and a body of phenolic condensation material between said shaft and laminations, said body being fixed to said shaft and to said laminations so as to mechanically support said laminations rigidly on said shaft, so as to insulate said laminations from said shaft, and so as to magnetically separate said laminations from said shaft, said laminations having portions slotted to receive an armature winding after said armature has been completed.

8. In a motor adapted to operate on either direct or alternating current, an armature comprising a shaft, a group of slotted annular laminations of magnetically permeable material surrounding said shaft and spaced a substantial distance therefrom, a body of phenolic condensation material fixed to said shaft and having said laminations embedded in it with portions of said body extending partially over the ends of the group of laminations to hold said laminations rigidly together, said body of phenolic condensation material also serving to mechanically support said laminations rigidly on said shaft, to insulate said laminations from said shaft, and to magnetically separate said laminations from said shaft, and a winding in the slots of said laminations on the exterior of said armature.

9. In a motor adapted to operate on either direct or alternating current, an armature comprising a shaft, a group of annular laminations of magnetically permeable material surrounding said shaft and spaced at a substantial distance therefrom, said laminations having notches in their inner edges, a body of phenolic condensation material molded onto said shaft and into the notches of said laminations and over the ends of said group of laminations to hold said laminations rigidly on said shaft, to insulate them therefrom, and to separate said laminations magnetically from said shaft, and a winding on the exterior of said laminations.

10. In a motor adapted to operate on either direct or alternating current, an armature having a shaft, a plurality of annular laminations of magnetically permeable material surrounding said shaft and spaced a substantial distance therefrom, a body of phenolic condensation material fixed to said shaft and having said laminations embedded in it to support the laminations rigidly on said shaft, to insulate said laminations from said shaft, and to separate said laminations magnetically from said shaft, said body having portions extending over the ends of said group of laminations to hold them together and extending outwardly on said shaft to form supports for armature windings placed on said laminations after said armature has been completed, and an armature winding on said laminations having its ends supported by the projecting portions of said body of phenolic condensation material.

THEODORE S. BINDSCHEDLER.